Feb. 7, 1939.     H. BERNHOLZ ET AL     2,146,005
INDICATING DEVICE
Filed April 15, 1937     2 Sheets-Sheet 1
Fig. 1.
Fig. 2.
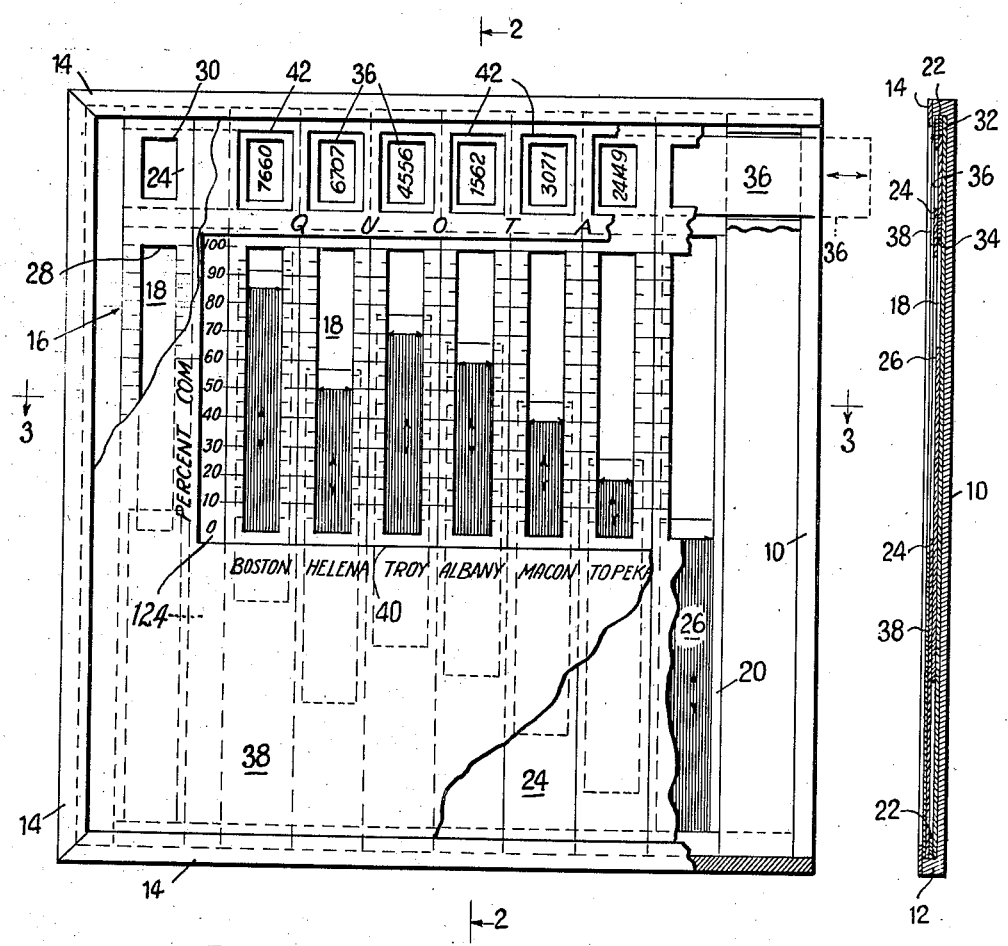
Fig. 3.
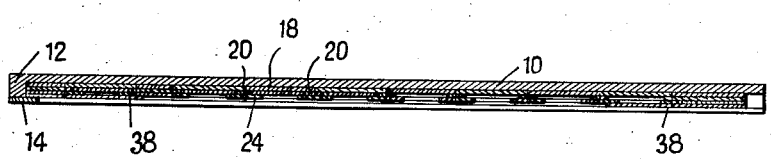
Herman Bernholz
James Sullivan     INVENTORS
BY
Brown & Jones     ATTORNEYS.

Feb. 7, 1939.  H. BERNHOLZ ET AL  2,146,005
INDICATING DEVICE
Filed April 15, 1937    2 Sheets-Sheet 2

INVENTOR.
Herman Bernholz
and
BY James Sullivan
Brown & Jones
ATTORNEYS.

Patented Feb. 7, 1939

2,146,005

UNITED STATES PATENT OFFICE 2,146,005

INDICATING DEVICE

Herman Bernholz, New York, and James Sullivan, Flushing, N. Y.

Application April 15, 1937, Serial No. 136,994

2 Claims. (Cl. 116—135)

This invention relates to an indicating device and more specifically to a comparative indicating device.

In general, it is an object of the invention to provide a device of the character described, which will efficiently perform the purposes for which it is intended, which is simple and economical of construction, which can be expeditiously, conveniently, and safely manipulated, and which can be readily manufactured and assembled.

Another object is to provide an indicating device adapted for giving successive values of a predetermined datum associated with some predetermined object, subject, or event, which values may be visibly compared with other successive values of some other predetermined datum associated with some other, or the same, predetermined object, subject, or event; to provide such a device with a set of norms, goals, etc., one associated with each of the variable datum indicators; to provide such a device with a plurality of interchangeable sets of norms and with a plurality of interchangeable scales for different types of values; to provide such a device the principal indicating units of which are removable; and to provide such a device which is light and thin.

Other objects of the invention will in part be obvious and will in part appear hereinafter.

The invention accordingly comprises an article of manufacture possessing the features, properties and the relation of elements which will be exemplified in the article hereinafter described and the scope of the application of which will be indicated in the claims.

For a fuller understanding of the nature and objects of the invention, reference should be had to the following detailed description, taken in connection with the accompanying drawings, in which:

Figure 1 is a plan view, with portions cut away to various levels, of a device embodying one form of the invention;

Fig. 2 is a sidewise sectional view in elevation of the device shown in Fig. 1, and taken along the line 2—2 of Fig. 1;

Fig. 3 is a sectional view in elevation of the device shown in Fig. 1 and taken along the line 3—3 of Fig. 1;

Figure 4:
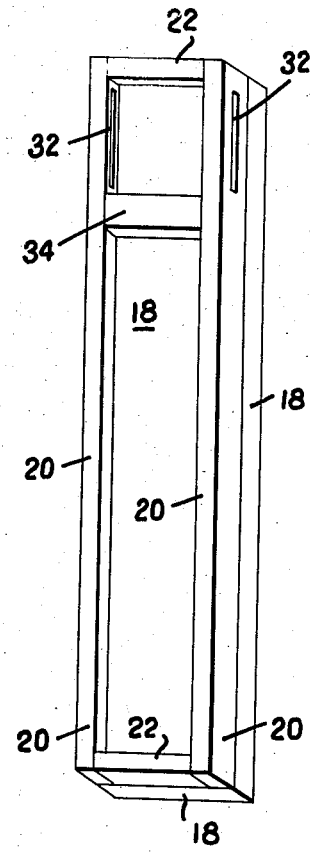
Fig. 4 is a perspective view of one of the removable units shown as removed and without its index, its cover, and without the heading element.
Figure 5:
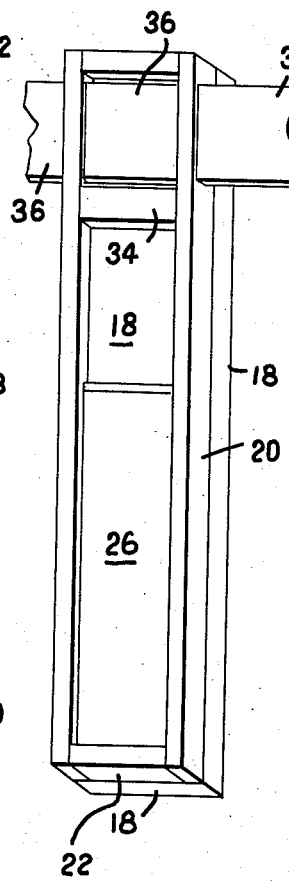
Fig. 5 is a view similar to Fig. 4 except that the index and heading element are shown.
Figure 6:
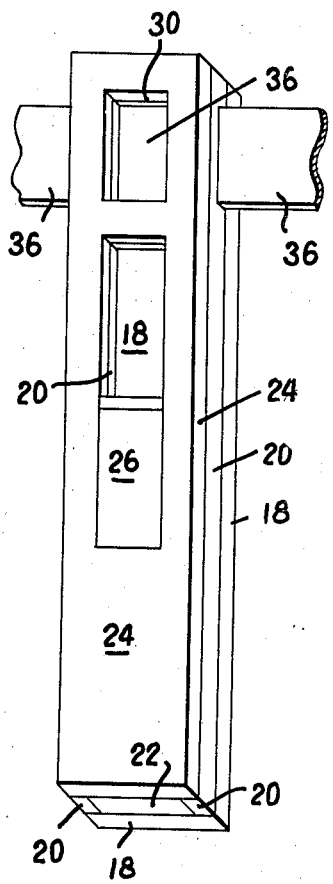
Fig. 6 is a view similar to Fig. 4 showing a unit with its index, its cover, and a heading element extending through the unit.

In the drawings, 10 denotes a back or base having a rim 12 which extends upward on three sides. The rim on the fourth side (not shown) is removable so that the elements to be described and lying on the base may be slid off. A ledge 14 is positioned on top of the rim 12 and extends somewhat centrally of the device so as to leave a space thereunder into which other elements may be caught. These elements or units 16 extend from one side to the other of the device and are caught at each end under ledge 14. There is a plurality of these units which are slid onto the base 10 from the open side where the rim is removed.

Each unit has its own base 18, lengthwise side walls 20, end walls 22, a cover 24 and an index 26. The cover 24 has an opening 28 which extends about half of the length of the unit. The index 26 lies on the base 18 between the side walls 20 and is slidable so as to show more or less through the opening 28. The cover 24 of each unit is also provided with another, preferably smaller, opening 30 between the opening 28 and one end of the unit. The side walls 20 have apertures 32 therein, giving a passageway through each unit from side to side and so positioned that the passageway is in registry with the opening 30 in the unit cover. There may be a cross-bar 34 running from one side wall to the other and assisting in defining the said passageway. There may be indicia on the cover 24 adjacent the opening 28 to show how far the index 26 has been or is to be moved.

The indices 26 may be flat strips of material. There is one index in each unit. The index lies on the base 18 between the side walls 20. It is covered on top at least in part by the cover 24 of the unit. It is slidable longitudinally on the base 18 of the unit and hence it is visible to a varying extent through the opening 28 of the cover of the unit. The index is caused to slide by pushing an instrument which has been inserted through the opening 28 against the index. An operator can use his finger to do this.

An element 36 for carrying headings extends through the passageway provided by the various apertures 32 in the various units. It also extends out through an opening in the detachable side wall or rim, which rim is not shown.

There may be a unit 124 of the same length as the others but without an index or an opening 28. This special unit may have a scale placed thereon and this unit may be positioned on one side of the other indicating unit.

An upper sheet 38 is inserted under the ledge 14 and on top of all of the units 16. It has a window 40 therein through which as many units as desired may be seen. Usually, only the parts of the units which show the indices are exposed. The sheet 38 may also have a plurality of smaller windows 42 which are in registry with the openings 30 in the various units. Sheet 38 may be provided with any desirable indicia, those shown in the drawings being "Boston", "Helena" "Troy", etc.

Those units 16, which are not needed at any particular time, may be turned up side down so that the base 18 of the unit is uppermost.

The following is one way of using the above-described indicating device. Let it be supposed that there is some fluctuating datum connected with the various cities, Boston, Helena, Troy, etc. Then, at any one predetermined time, for example, the first of the month, the index for each city may be moved to show either the value of datum as of that day, or what percentage that datum is of some predetermined norm. On the element 36 is marked, at the proper positions, some correlated figure for each city, for example, the maximum for the datum being considered. By looking through the little window 42, one then can tell what the maximum value for Boston is and what percentage of that the datum gives at the moment. Similarly for the other indices. When it is desired to consider some other datum, a different element 36 is slid into place, or a different set of indicia are supplied on the one element 36 but so positioned thereon that they are brought into view through the respective windows 42 by a sliding motion of the element 36.

It will be recognized that the present device is most useful for illustrating and maintaining statistical reports, progress charts, stock records, etc. It is available to all fields where an up-to-the-minute record is desired of the status of any varying event, especially where there is a goal, par, or norm. It can be used in inventories, in sales, or in charity campaigns, etc.

All of the various parts may be made of light card board.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and useful and desire to secure by Letters Patent is:

1. An indicating device comprising a supporting structure, a plurality of indicating units, each of said units providing a chamber and having an indicating unit in said chamber and providing a passageway, in registry with the passageways in the others of said units, and an opening into said passageway, and a removable element extending through said passageways and visible through said openings.

2. An indicating device comprising a supporting structure, a plurality of indicating units, each of said units providing a chamber closed except for an opening in the top thereof, and having an indicating unit in said chamber and longer than and visible through said opening, and providing a passageway, in registry with the passageways in the others of said units, and an opening into said passageway, and a removable element extending through said passageways and visible through said openings.

HERMAN BERNHOLZ.
JAMES SULLIVAN.